United States Patent [19]
Brickner et al.

[11] Patent Number: 5,956,195
[45] Date of Patent: Sep. 21, 1999

[54] METHOD AND APPARATUS FOR THREE DIMENSIONAL SEQUENCE ESTIMATION IN PARTIALLY CONSTRAINED BINARY CHANNELS

[75] Inventors: Barrett J. Brickner, Minneapolis; Jaekyun Moon, Plymouth, both of Minn.

[73] Assignee: Regents of the University of Minnesota, Minneapolis, Minn.

[21] Appl. No.: 08/828,497

[22] Filed: Mar. 31, 1997

[51] Int. Cl.[6] .............................. G11B 5/035; H03M 7/00; G06F 17/10
[52] U.S. Cl. ......................... 360/65; 341/59; 364/724.2; 375/233
[58] Field of Search ....................... 360/46, 65; 375/233, 375/246, 248, 290; 364/724.2; 341/59

[56] References Cited

U.S. PATENT DOCUMENTS

| | | | |
|---|---|---|---|
| 4,945,538 | 7/1990 | Patel | 371/43 |
| 4,985,902 | 1/1991 | Gurcan | 375/14 |

(List continued on next page.)

OTHER PUBLICATIONS

Brickner, B., et al., "3D–110 Derivation of a Novel FDTS/DF t+2 MTR+2 Coded DFE–110 Channel", *Center for Micromagnetics and Information Technologies, U of M*, 1–7, (1996).

Brickner, B., et al., "A High Dimensional Signal Space Implementation of FDTS/DF", *IEE Transactions on Magnetics, 32*, 3941–3943, (1996).

Brickner, B., et al., "Architectures for 3D–110 Detection", *Mint Research Review*, 1–2, (1996).

Brickner, B., et al., "High Data Rate Detection for 3D–110 Channels", *IEEE Transactions on Magnetics, 33*, 2806–2808, (1997).

Brickner, B., et al., "Two–Bit Wide 3D–110 Detection", *CDSLab Report No. BB–96–04, U of M*, 1–6, (1996).

Kenney, J.G., et al., "Multi–Level Decision Feedback Equalization for Saturation Recording", *IEEE Transactions on Magnetics, 29*, 2160–2171, (1993).

Moon, J., "Signal Processing in Data Storage Systems", *IEEE Signal Processing (not in print)*, 1–38, (1997).

Moon, J., et al., "Efficient Sequence Detection for Intersymbol Interference Channels with Run–Length Constraints", *IEEE Transactions on Communications, 42, 9*, 2654–2171, (1994).

Patel, A.M., "A New Digital Signal Processing Channel for Data Storage Products", *IEEE Transactions on Magnetics, 27, 6*, 4579–4584, (1991).

*Primary Examiner*—Aristotelis M. Psitos
*Assistant Examiner*—Regina Y. Neal
*Attorney, Agent, or Firm*—Schwegman, Lundberg, Woesnner & Kluth PA

[57] ABSTRACT

An information handling system, such as a magnetic disk drive, includes a data channel which has a method and apparatus for detecting binary symbols from a received signal subject to intersymbol interference and additive white Gaussian noise using a three dimensional observation space with orthogonal coordinate axes. Each of three consecutive synchronous observation samples of the received signal corresponding unambiguously to an axis in the observation space. A decision feedback equalizer removes intersymbol interference terms associated with prior detector outputs. A plurality of linear classifiers are used to partition the observation space. The second and/or third sample of the equivalent channel response is constrained relative to the first for the purpose of simplifying the linear classifiers. Boolean logic functions to decide into which decision region of the observation space a sample maps into. Incorporation of modulation coding constraints reduce the probability of error by increasing the Euclidean distance between symbols in the observation space. Symbol estimates are produced synchronously with a delay of two with respect to the current observation sample.

35 Claims, 9 Drawing Sheets

U.S. PATENT DOCUMENTS

| | | | |
|---|---|---|---|
| 5,132,988 | 7/1992 | Fisher et al. | 375/14 |
| 5,136,593 | 8/1992 | Moon et al. | 371/43 |
| 5,282,216 | 1/1994 | Patel et al. | 371/43 |
| 5,327,440 | 7/1994 | Fredrickson et al. | 371/43 |
| 5,357,520 | 10/1994 | Arnett et al. | 371/21.2 |
| 5,370,863 | 12/1994 | Barney et al. | 424/49 |
| 5,430,661 | 7/1995 | Fisher et al. | 364/488 |
| 5,438,460 | 8/1995 | Coker et al. | 360/46 |
| 5,731,768 | 3/1998 | Tsang | 341/59 |
| 5,793,759 | 8/1998 | Rakib et al. | 370/342 |
| 5,805,478 | 9/1998 | Kim | 364/724.2 |

METHOD AND APPARATUS FOR THREE DIMENSIONAL SEQUENCE ESTIMATION IN PARTIALLY CONSTRAINED BINARY CHANNELS

RELATED APPLICATION

The present is related to an application entitled "METHOD AND APPARATUS FOR HIGH DATA RATE DETECTION FOR THREE DIMENSIONAL 110 CHANNELS" which is assigned to a common assignee and which is filed on a date even herewith. The related application is incorporated by reference in this application.

FIELD OF THE INVENTION

The present invention relates in general to information storage systems and in particular to a method and apparatus for implementing three-dimensional detection of binary signals in a constrained response magnetic recording system.

BACKGROUND OF THE INVENTION

Computers often include information storage systems having media on which data can be written and from which data can be read for later use. One form of information storage system is a disk drive. Disk drives use various types of media. One more common form is a drive unit incorporating one or more disks having a magnetic coating on the surface of the disk. Data is recorded in tracks which are subsections of the magnetic coating on the surface of the disk. Transducers are used to magnetize portions of the magnetic surface in a write operation. In digital magnetic recording systems, data are stored by writing a sequence of magnets with alternating polarity onto a medium using a write head (transducer). The binary ones and zeros of the stored data are represented either as the two possible magnetic polarities or the change or absence of change. Information is retrieved using a read head (transducer).

The read head and the write head are part of what is known as a data channel. The data channel handles data from a source, such as the computer, and writes it to a disk on a disk drive where it is stored for later retrieval. The data channel also handles reading individual magnetic transitions from the disk to retrieve that data previously stored. The data channel manipulates the readback signal produced by the read head (transducer) to produce a representation of the data previously stored. It should be noted that the read head and write head may be two separate transducers or may be a single transducer used for both reading and writing data.

The read head is configured such that a change in the polarity of the magnetization pattern results in a non-zero amplitude value in the transducer output. Because the read heads used in storage devices have a limited bandwidth, the response of the read transducer to a change in magnetization is a pulse with a non-zero width. Linear density is the number of bits of data that can be stored in a unit length of a track on the media. At linear densities of interest in present and future storage devices, the transition response pulse is sufficiently wide to add non-zero amplitude components to the signal in adjacent bit periods. This mechanism is known as intersymbol interference (ISI).

For reasons of convenience and practicality, the channel noise is assumed to be additive white Gaussian noise (AWGN). Gaussian or normal distributions are well known statistical models that accurately describe the thermal and electronics noise produced by the resistive component of the read transducer and the electronics of the preamplifier required to amplify the transducer output to usable levels. In terms of random variables, the term white indicates that observations of the random variable are uncorrelated; observations of a correlated random variable are said to be colored. Additive noise indicates that summing the noiseless signal s(t) and noise n(t) produces the received signal r(t)=s(t)+n(t), which implies that the signal and noise are uncorrelated.

A detector is also part of the data channel. The detector is the portion of the read channel that determines if a particular bit has a value of "1", which indicates a magnetic polarity in a first direction, or a "0", which indicates a magnetic polarity in a second direction. In earlier recording systems, data bits were detected by making a sample-by-sample decisions with a peak detection circuit, which made necessary the use of runlength limited (RLL) codes. This type of detector is called a peak detector. In terms of ISI, the function of the ISI code was to guarantee a minimum spacing between transitions so that the ISI components from adjacent transitions did not reduce the amplitude of the present transition below the detection threshold. Unfortunately, this technique is inefficient because it ignores the information content in the adjacent samples.

A second general type of detector is known as a sequence detector. Sequence detectors take advantage of the ISI terms by examining adjacent samples before making a decision. The Viterbi algorithm (VA) is an efficient means for implementing the maximum likelihood sequence detector (MLSD) which chooses the sequence that most likely produced the received or read signal. The complexity of the VA detector increases exponentially as the number of ISI terms increases. One type of magnetic storage device in use today overcomes this limitation by shaping the channel to produce partial response signals that have a predetermined and limited number of ISI terms. After shaping the channel response, a Viterbi algorithm is used to perform a maximum likelihood sequence detection. This type of sequence detector is known as a Partial Response Maximum Likelihood (PRML) detector. PRML detectors are commonly used in current information storage systems, such as disk drives.

PRML detectors have shortcomings. Several of the shortcomings result from the transition response being forced into something other than its natural shape. The performance of these partial response maximum likelihood (PRML) detectors also degrades as the channel response changes. The Viterbi detectors also become increasingly complex as the number of terms or samples used is increased.

Fixed delay tree search with decision feedback (FDTS/DF) performs sequence detection over a finite number of samples, generally less than the number of ISI terms. The unused ISI terms are subtracted by means of a nonlinear filter structure known as a decision feedback equalizer, which matches the shape of the unused tail of the channel response. Although FDTS/DF does not perform as well as the VA detector, it can outperform PRML schemes at high linear densities because the channel does not need to be shaped into a partial response form. An additional benefit of FDTS/DF is that the delay between the detector input and the decision is fixed and equal to the number of additional samples used in the decision process, i.e., if a total of three observation samples are used, the detector delay is $\tau=2$. For a linear ISI channel with AWGN operating at a low bit error rate, FDTS/DF provides optimal detection for the implicit delay constraint. This is in contrast to MLSD which can outperform FDTS/DF because it has no delay constraint.

Signal space detection is similar to FDTS/DF in that it imposes a delay constraint of $\tau$ and employs a decision feedback equalizer. Unlike FDTS/DF which compares the received sample sequence against all possible sequences, the signal space detector (SSD) partitions a τ+1 dimensional space formed by the received samples into decision regions. In the general case, the partition boundaries can be nonlinear to accommodate non-Gaussian noise, but for Gaussian noise the partitions are formed by combining linear classifiers. Using linear classifiers with Gaussian noise, the optimal performance of the SSD matches that of FDTS/DF. A discussion of general signal space detection is given in a paper by B. Brickner et al. entitled "A signal space representation of fixed delay tree search for use with d=0 codes" from the Conference Record of the IEEE Globecom '95 Conference, Singapore, November 1995. A copy of this publication is attached hereto as Exhibit A and is expressly incorporated herein by reference.

SUMMARY OF THE INVENTION

The present invention pertains to a method and apparatus for performing sequence detection in a three dimensional signal space using a partially constrained channel with binary inputs, where the purpose of the constraint is to simplify the detector hardware. According to a first embodiment, the three dimensional signal space detector is one in which three consecutive received symbols resulting from a convolution of the input sequence with the channel response form a three-dimensional space. In some cases, the general three dimensional space can be projected onto a subspace with lower dimensionality, a process that typically alters the noise statistics. When the natural response of the channel requires more than three dimensions, a decision feedback equalizer (DFE) is used to eliminate ISI components beyond the first three dimensions.

The receive filter, which may be implemented as a continuous time, discrete time, or a combination of the two, shapes the signal constellation into a predetermined set of coordinates possibly subject to some noise minimization criterion such as a minimum mean squared error (MMSE) criterion. Alternatively, this shaping requirement can be expressed as a constraint on either two or three of the first three terms in the sampled channel response, F(D). Forcing a single term to take a particular value is not considered a constraint because such a requirement amounts simply to scaling the observation, which affects the signal and noise in equal proportion.

The receive filter produces an output, which if not already in discrete time, is sampled synchronous with the channel input via a timing recovery circuit. The output from the feedback filter, if present, is subtracted from the receive filter output sample to yield a detector observation sample at time t=kT $$y_k = f_0 a_k + f_1 a_{k-1} + f_2 a_{k-2} + v_k \qquad (1)$$

where T is the sample period, $f_i$ are the channel response samples, $a_k$ are bipolar binary inputs (usually −1 and +1), and $v_k$ is the equalized, sampled noise term.

With binary signaling, the received symbols can be separated into two symbol sets corresponding to the two possible channel inputs. Detection of the input symbol is done by estimating in a maximum likelihood sense the symbol set to which the observation set belongs. The input symbol $a_{k-2}$ is estimated using a nonlinear detector structure consisting of one or more linear classifiers whose outputs are combined by a two level Boolean logic rule to form decision regions in the observation space. For channels employing modulation codes with constraints designed to increase the minimum distance between symbol sets, the linear classifiers and the decision logic are modified to accommodate the constraint and produce the desired distance increase. Each decision region is mapped to one of the two possible channel inputs such that a set of observations corresponding to a point in that region produces a detector output equivalent to the corresponding input symbol.

Figure 11:
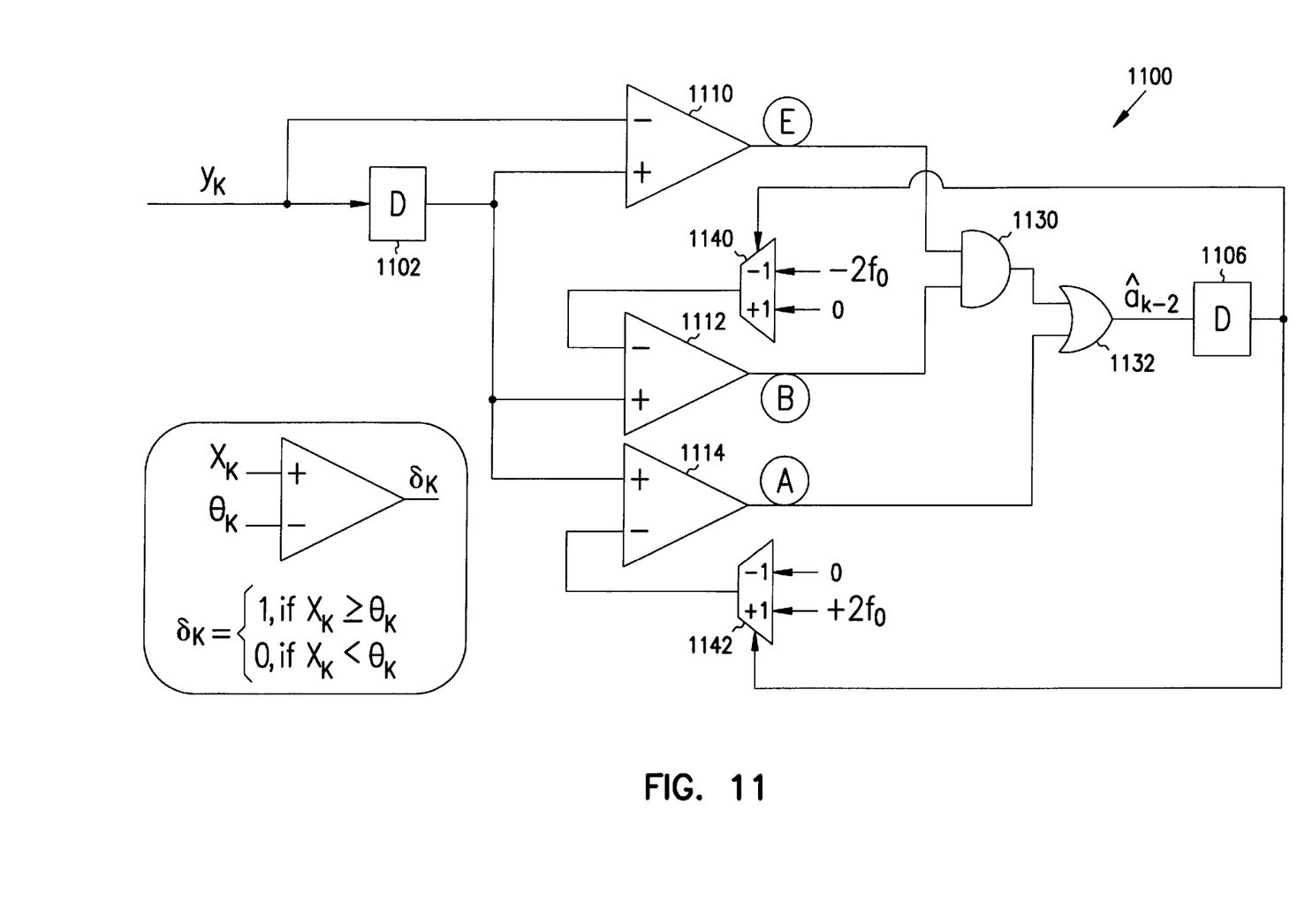
FIG. 11 is another preferred embodiment of a detector apparatus for implementation of this invention.

According to a second embodiment of the invention, a 1+D factor is included in the equalizers such that the dimensionality of the observation space is reduced by one dimension. The number of observation samples can be reduced with a corresponding reduction in the classifier complexity by projecting the three dimensional space onto two dimensions. The end result is simpler detector apparatus 1100 for the read data channel 330. In the previous embodiment of the 3D-110 detector, boundaries A and B both include the sum $y_{k-1}+y_{k-2}$. This operation can be performed with the equalizers by placing a 1+D filter in both the forward and feedback filters, which changes the observation to $$y_k = f_0 a_k + 2f_1 a_{k-1} + f_2 a_{k-2} + \tilde{v}_k$$

where $\tilde{v}_k$ is the noise term previously labeled $v_k$ colored by the 1+D filter.

According to a third embodiment, the constraint is relaxed to $\{1, 1, \alpha\}$ so that the third value, $\alpha = f_2/f_0$, is unconstrained. Because the projection of the $\{1, 1, 0\}$ constraint onto the two dimensional subspace yielded a simpler apparatus, the embodiment of this constraint is considered under the same transformation, i.e., the observation is $$y_k = f_0(a_k + 2a_{k-1} + (1+\alpha)a_{k-2}) + \tilde{v}_k.$$

Advantageously, the detectors described herein have increased performance at higher user bit densities when compared to a comparable PRML detector. The detectors are less complex when compared to an FDTS operating on a natural response. These and various other features as well as advantages which characterize the present invention will be apparent upon reading of the following detailed description and review of the associated drawings.

DESCRIPTION OF THE PREFERRED EMBODIMENTS

In the following detailed description of the preferred embodiment, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
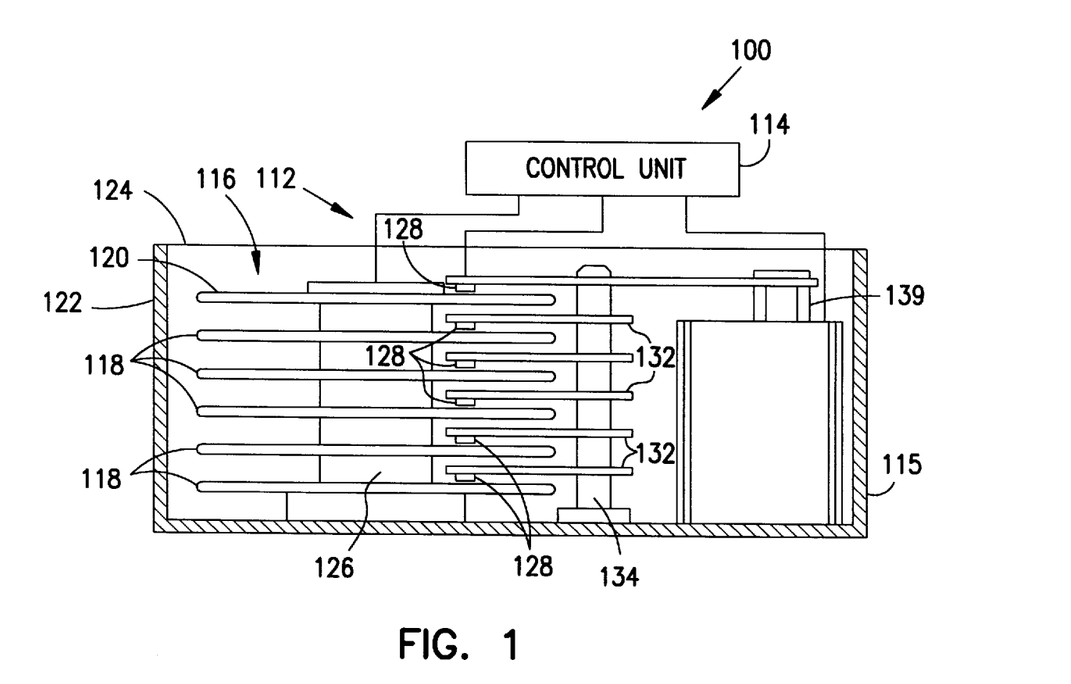
FIG. 1 is a schematic and block diagram of an information handling system embodying the present invention.

FIG. 1 is a schematic and block diagram of an information handling system embodying the present invention. An information handling system 100, includes a data storage medium 112 and interface control unit 114. In the preferred embodiments of this invention the data storage medium 112 comprises a rigid magnetic disk drive 115, although it should be readily understood that any other mechanically moving memory configuration may be used. The magnetic disk drive 115 is illustrated in simplified form sufficient for an understanding of the present invention. The utility of the present invention is not limited to the details of a particular information handling system or to the specific disk drive shown.

Figure 2:
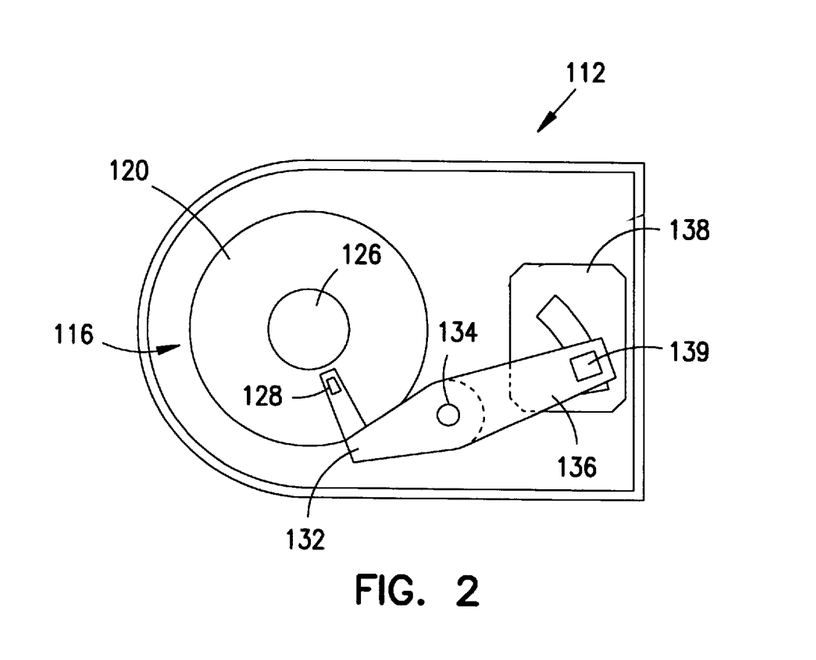
FIG. 2 is a top view of an information handling system embodying the present invention.

Now referring to both FIGS. 1 and 2 the disk drive 115 portion of the information handling system 100 will be detailed. FIGS. 1 and 2 show the principal electrical and mechanical components of a disk drive 115 constructed in accordance with a preferred embodiment of this invention. The disk drive 115 includes a head/disk assembly, which includes a base 122 and a cover 124. Attached to the base 122 is a spindle with an attached hub 126. Attached to the spindle with an attached hub 126 are a stack 116 of disks 118. It should be noted that some disk drives have a single disk and that this invention is equally applicable to a single disk version of a disk drive. The stack 116 of disks 118 includes at least one magnetic surface 120. Also attached to the base is a spindle motor (not shown) which rotates the spindle with an attached hub 126 and the disks 118 mounted to the hub 126. An actuator 134 includes arms 132 that carry transducers 128 in transducing relation to one of the disks. A portion of an actuator motor 139 is attached to the actuator 132 and positions one or more transducers 128 to different radial positions relative to one or more magnetic surfaces 120 of the disk 118.

Figure 3:
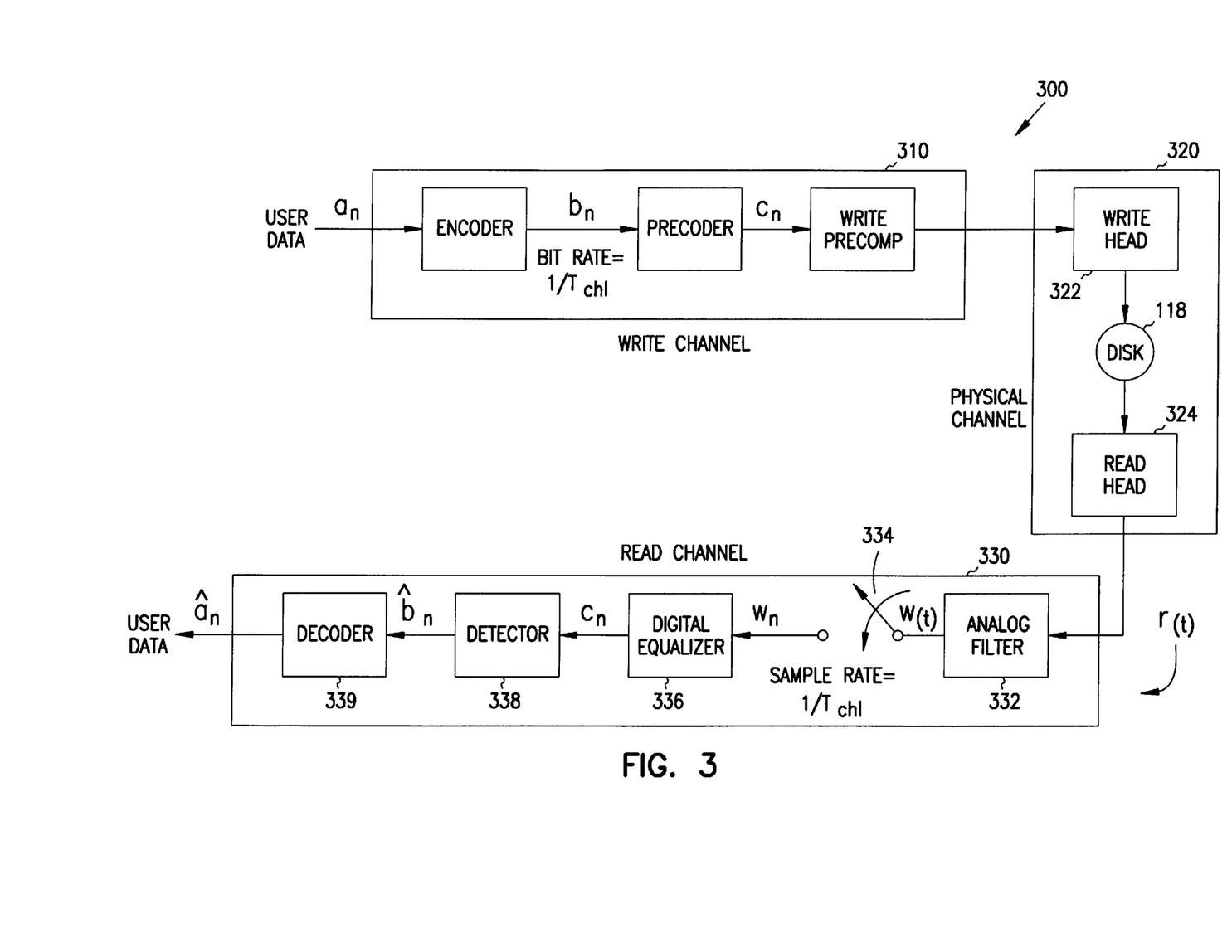
FIG. 3 is a schematic diagram of a data channel for use with the information handling system of FIGS. 1 and 2.

The disk drive 115 also includes a data channel 300. A schematic or block diagram of the data channel 300 is shown in FIG. 3. The data channel 300 includes a write channel 310, a physical channel 320 and a read channel 330. The write channel 310 includes an encoder 312, a precoder 314, and write precompensation circuitry 316. The encoder 312 and the precoder 344 implement a Maximum Transition Run ("MTR") code. The particular MTR code used limits the maximum number of consecutive transitions to 2. It should be noted that code used is not limited to an MTR code. The precompensation circuitry 316 changes the signal to be written to the disk so that it can be retrieved more easily from the disk by the read head and read channel 330. The physical channel 320 includes a write head 322, a disk 118, and a read head 324. The read head 324 and write head 320 are also known as transducers. In some instances, the read head and the write head may be the same transducer. The write head 322 includes a coil. When a write current is passed through the write head 322 in one direction, the magnetic surface of a disk 118 is magnetized in a first direction. When a write current is passed through the write head 322 in the opposite direction, the magnetic surface of a disk 118 is magnetized in a second direction. Normally, the disk 118 maintains its magnetized state until the area of the disk is rewritten or remagnetized. The read head 324 produces a signal based on the magnetized state of the disk 118 below the read head 324. The signal from the read head 324 is passed into the read channel 330.

The read channel 330 includes a filter 332, a sampler 334, an equalizer 336, a detector 338 and a decoder 339. The filter 332 filters out unwanted portions of the signal from the read head. Samples are taken at the sampler 334. The sampled signal is equalized at the equalizer 336. The output of the equalizer 336 is input to a detector 338 which estimates the value of various sampled portions. The output of the detector 338 is passed through a decoder 339 to produce the read back user data.

The input to the channel is a coded binary signal representing data to be stored or transmitted. In addition to compression and error correction codes often employed in communications and storage channels, a modulation code is typically employed to suppress unwanted patterns or to introduce certain desirable characteristics in the channel input data. For more information on general coding techniques used in data storage, see P. H. Siegel et al., "Modulation and coding for information storage," *IEEE Transactions on Communications*, December 1991, pp. 68–86. A specific code constraint that will be employed with the invention to yield a reduction in error rate is the maximum transition run (MTR) code described in J. Moon et al., "Maximum transition run coding for data storage systems," *IEEE Transactions on Magnetics*, September 1996, pp. 3992–3994. The MTR code with constraint j=2 limits the maximum number of consecutive transitions in the recorded data to two.

Figure 4:
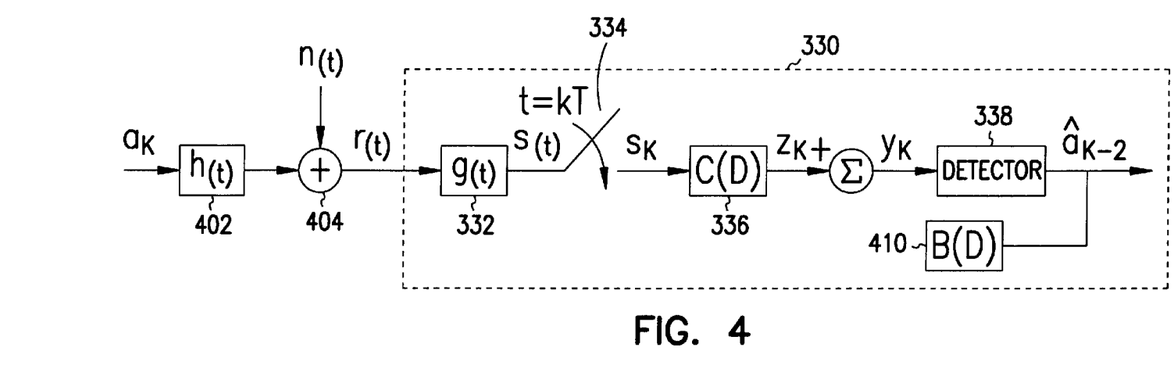
FIG. 4 is a schematic diagram of a read signal and some of the operations performed thereon according to the present invention.

FIG. 4 is a schematic diagram of a read signal and some of the operations performed thereon according to the present invention. Referring to FIG. 1, the modulated input signal $a_k$ is convolved with the channel response h(t), depicted by box 402, and combined with additive noise n(t), shown as adder 404, to produce a continuous time read signal r(t). Typically, the read signal is processed by a continuous time filter g(t), such as filter 332, to produce a bandlimited signal s(t) prior to sampling. The signal is sampled at constant or near constant time intervals T that are synchronous with input signal $a_k$. The sampling is done at sampler 334. Although timing recovery is necessary for the proper operation of the detector, it is not an explicit component of the invention. Discussions on timing recovery may be found in K. H. Mueller et al., "Timing recovery in digital synchronous systems," *IEEE Transactions on Communications*, pp. 516–531, May 1976. The effective channel response, which is the combined response of the channel and the receiver filters, is specified by some shaping constraint subject to a minimization of noise. Although this operation may be combined with g(t), it is generally performed by a separate, discrete time filter C(D), such as the equalizer 336 shown in FIG. 3. The result of filtering the synchronous samples $s_k$ with C(D) is $z_k$, which can be written as $$z_k = \sum_{i=0}^{l-1} f_i a_k + v_k \quad (2)$$

where $\{f_i\}$ is the effective channel response and $v_k$ is the channel noise. The length of the effective response is l, which depends on the actual channel response h(t) and the filters. In a sampled data system, the component of the equalized channel response which multiplies the present input is referred to as the cursor term, and the samples which are multiplied by past inputs are referred to as the postcursor terms. Typically, the cursor term is the first non-zero component of the sampled equalized response. Although the precursor (future) terms may take non-zero values under some equalization design criteria, their magnitude is assumed to be negligibly small relative to the cursor term for practical systems of interest. When $l>\tau$, a feedback filter B(D), depicted by reference number 410, is used to cancel the known postcursor ISI terms, yielding and observation $y_k$ that is a function of the unknown channel inputs and the filtered noise as indicated in (1). The postcursor ISI terms are removed at a summer 412 which is positioned before the detector 410. This implies when $l<\tau$, a feedback filter B(D) is not required. Note that this implies the detector 338 is operating at high SNR (low error rate) so that the detector outputs are assumed to be correct.

The invention pertains to the detector block 338 and includes constraining of the channel response, which requires adjustment of the forward filters g(t), depicted by reference number 332, and C(D), depicted by reference number 336, and the feedback filter B(D), depicted by reference number 410. The detector block includes a signal space detector adjusted to suit the chosen channel constraint along with any applicable modulation code constraint.

Signal space detection employs an array of linear classifiers combined with a Boolean logic rule to form decision regions in an m-dimensional space. For the m=3 dimensional case relevant to the invention, the classifiers indicate on which side of a plane in the observation space the input lies. Under the assumption of additive white Gaussian noise, the plane is the locus of points equidistant from the two symbols to be differentiated. For two symbols $p=(p_0,p_1,p_2)$ and $q=(q_0,q_1,q_2)$ in the three dimensional space, the closest symbol to the set of observations $y_k=(y_k,y_{k-1},y_{k-2})$ is determined using $$\gamma_k = sgn\{w_0 y_k + w_1(y_{k-1} - f_2 \hat{a}_{k-3}) + w_2(y_{k-2} - f_1 \hat{a}_{k-3} - f_2 \hat{a}_{k-4}) - \theta\} \quad (3)$$

where $$w_i = 2\kappa(p_i - q_i), \quad (4)$$

$$\theta = \kappa \sum_{i=0}^{2} (p_i^2 - q_i^2), \quad (5)$$

and $\kappa$ is any real number greater than zero. The sign function $sgn\{\cdot\}$ produces a positive logic value when the argument is greater than or equal to zero and a negative logic value otherwise. Because this operation is only concerned with the argument's sign, any $\kappa>0$ is permissible. In the preferred embodiments, $\kappa$ is adjusted to reduce the number of required gain terms by scaling one or more to unity.

A number of linear classifiers sufficient to partition the observation space into appropriate decision regions are operated in parallel. The outputs from the classifiers are combined by means of a Boolean logic circuit to form an output term $\hat{a}_{k-2}$ that is a maximum likelihood estimate of $a_{k-2}$ given $y_k$, the previous outputs, and the delay constraint that the decision be made prior to knowledge of $y_{k+1}$.

The invention incorporates an equalization constraint that specifies $f_1$, $f_2$, or both relative to $f_0$. Although these terms could be fixed at any value, the preferred embodiments employ constraints that simplify the apparatus of the detector according to some criterion. Specific examples of useful criteria include the reduction of summing nodes, multipliers, sample storage elements, number of inputs to a circuit node, and number of outputs from a circuit node.

In accordance with the present invention, a signal space detector is formulated for the channel constraints $f_0=f_1$ and $f_2=0$. This constraint is described by the label DFE-110 which indicates that the first three samples of the normalized effective channel response are 1, 1, and 0, and any remaining terms are eliminated via decision feedback equalization. If there are no terms beyond 1, 1, 0 then no decision feedback is required. The apparatus of a three dimensional signal space detector incorporating this constraint is referred to as a 3D-110 detector.

Figure 5:
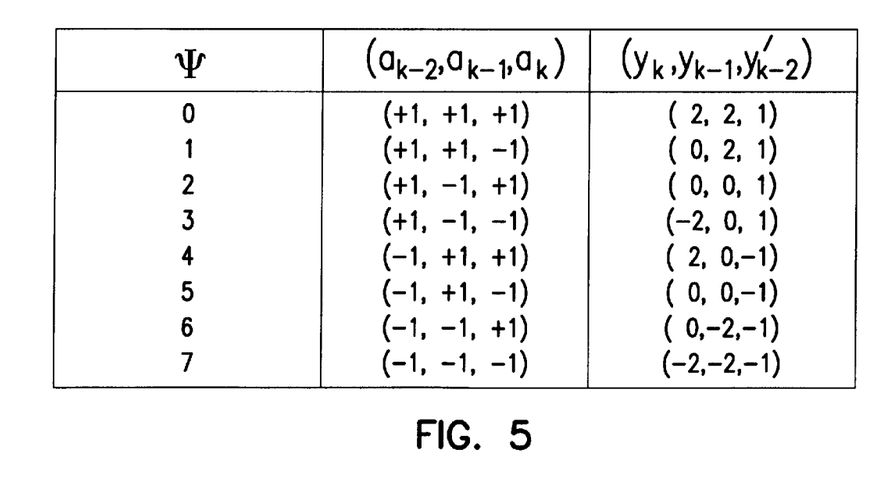
FIG. 5 is a table showing all possible combinations of $\{a_k, a_{k-1}, a_{k-2}\}$, the symbol coordinates, in the observation space where past ISI terms have been removed and all possible combinations of $\{y, y_{k-1}, y'_{k-2}\}$, the set of observations.
Figure 6:
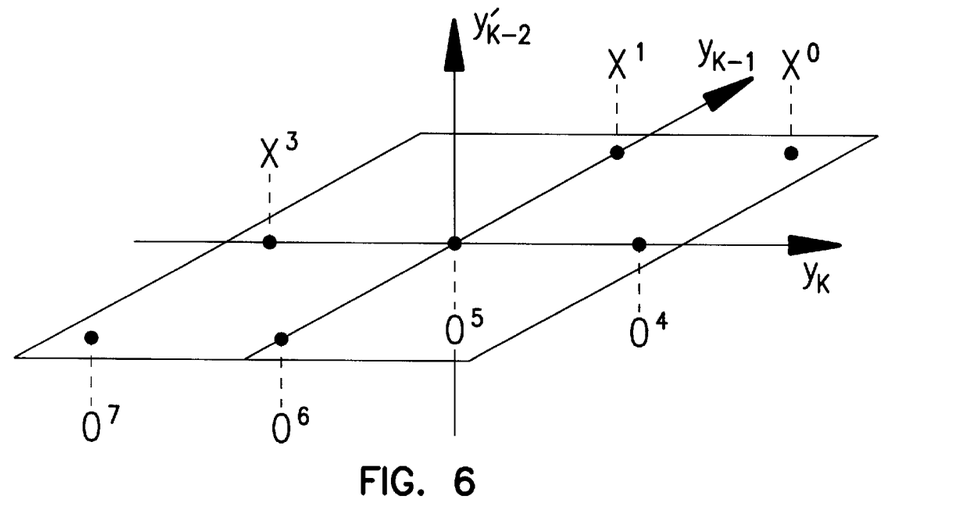
FIG. 6 is a graph of signal space showing all possible combinations of $\{a_k, a_{k-1}, a_{k-2}\}$, the symbol coordinates, where the 'X' symbols correspond to $a_{k-2}=1$ and the 'O' symbols to $a_{k-2}=1$, and where the symbol labels correspond to the values of Ψ in FIG. 5.
Figure 7:
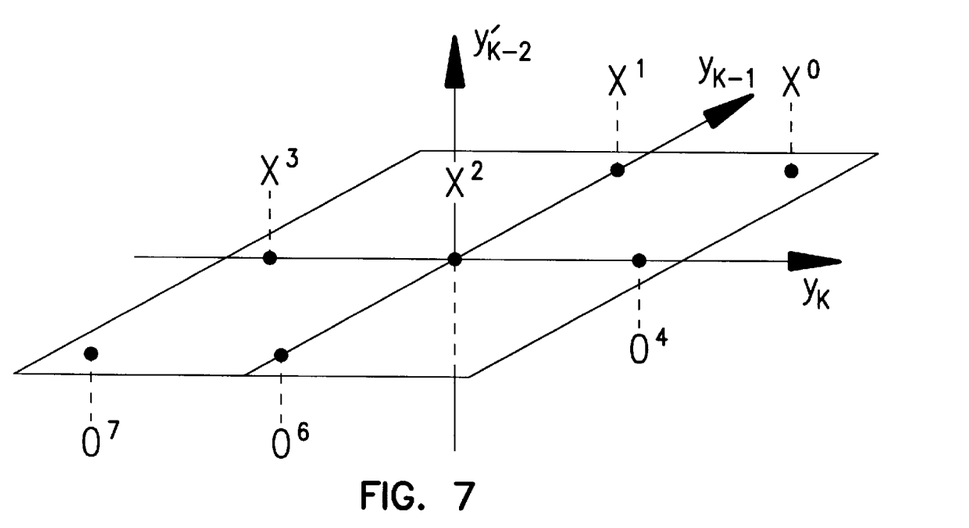
FIG. 7 is a graph of signal space showing all possible combinations of $\{a_k, a_{k-1}, a_{k-2}\}$, the symbol coordinates, assuming a previous decision of +1.

Now referring to FIGS. 5–9, the partitioning of the observation space with a number of linear classifiers into appropriate decision regions operating in parallel will be further detailed. Considering all possible combinations of $\{a_k, a_{k-1}, a_{k-2}\}$, the symbol coordinates in the observation space where past ISI terms have been removed are given in the table shown in FIG. 5. The resulting signal space is shown in FIG. 6, where the 'X' symbols correspond to $a_{k-2}=1$ and the 'O' symbols to $a_{k-2}=-1$, and where the symbol labels correspond to the values of $\Psi$ in FIG. 2. In any case where $f_2=0$, removal of known ISI terms will not affect $y_{k-1}$, whereas $y'_{k-2}=y_{k-2}-f_1 \hat{a}_{k-3}$. In this constellation, the closest pair of symbols corresponding to different decisions are the symbols labeled 2 and 5, which are produced by the inputs $\{+1,-1,+1\}$ and $\{-1,+1,-1\}$, respectively. Because the detector performance will improve with an increase in the minimum distance between the two symbol sets, an MTR code is employed to give a distance gain. The maximum transition run parameter is selected to be j=2, which prohibits input sequences containing three or more consecutive transitions. Examination of symbols 2 and 5 indicate that for an input of −1, symbol 2 is invalid, and 5 is illegal if the input is +1. With the MTRj=2 code, the constellation assuming a previous decision of +1 is shown in FIG. 7. For the other input, symbol 2 would be absent with symbol 5 present. The quotient of the new distance to the old is $\sqrt{2}$, which yields a significant distance gain of 3 dB.

Figure 8:
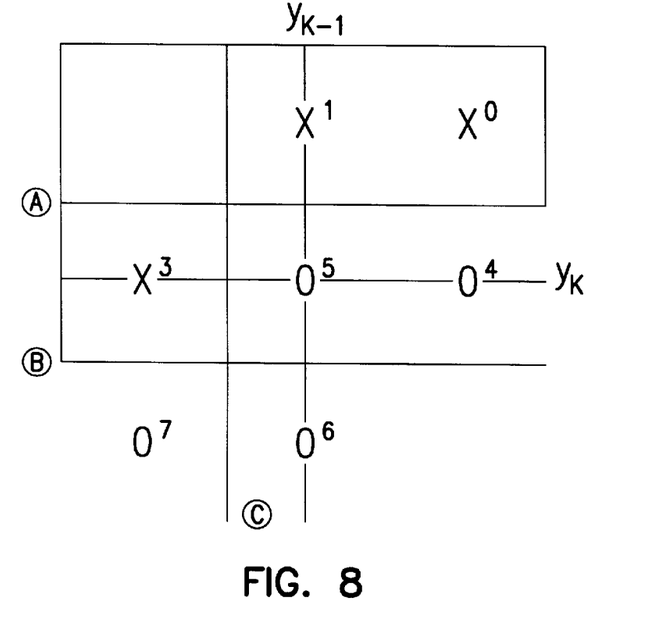
FIG. 8 is a graphical view of the relevant boundaries where $a_{k-3}=-1$.
Figure 9:
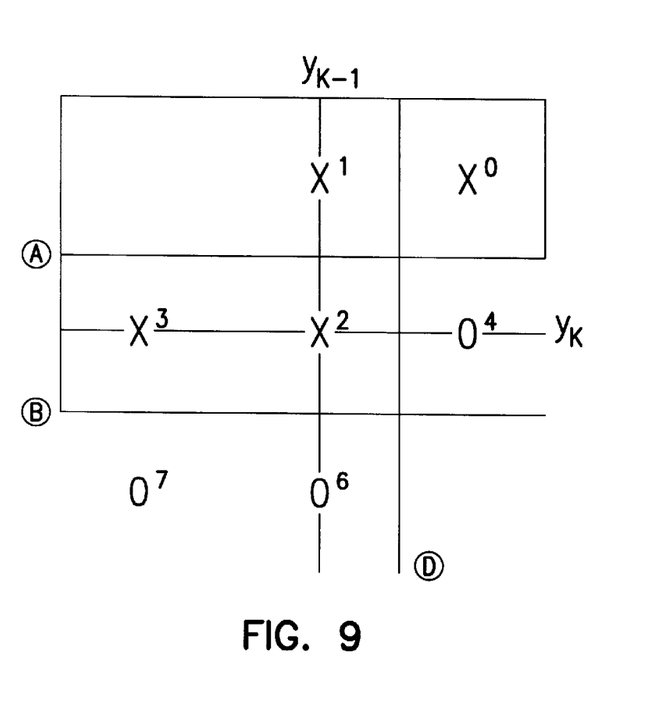
FIG. 9 is a graphical view of the relevant boundaries where $a_{k-3}$=+1.

The linear classifiers are chosen by considering all possible pairs of symbols, one of each from the two symbol sets corresponding to the binary input. This process will yield redundant boundaries which are removed. The signal space and relevant boundaries for the two possible inputs can be conveniently illustrated by rotating the three dimensional space so that the $y'_{k-2}$ axis is out of the plane of the paper toward the reader as shown in FIG. 8 for $a_{k-3}=-1$ and in FIG. 9 for $a_{k-3}=+1$. Assuming that $\kappa$ is chosen to be 0.5 for the normalized channel response, the classifiers for the boundaries in FIGS. 8 and 9 are given by $$A = sgn\{y_{k-1} + y_{k-2}' - 1\} = sgn\{y_{k-1} + y_{k-2} - \hat{a}_{k-3} - 1\}$$

$$B = sgn\{y_{k-1} + y_{k-2}' + 1\} = sgn\{y_{k-1} + y_{k-2} - \hat{a}_{k-3} + 1\}$$

$$C = sgn\{-y_k + y_{k-2}' - 1\} = sgn\{-y_k + y_{k-2} - \hat{a}_{k-3} - 1\}$$

$$D = sgn\{-y_k + y_{k-2}' + 1\} = sgn\{-y_k + y_{k-2} - \hat{a}_{k-3} + 1\} \quad (6)$$

Because boundary C is used only when $\hat{a}_{k-3} = -1$ and D is valid only when $\hat{a}_{k-3} = +1$, these two classifiers can be merged to give $$E = sgn\{-y_k + y_{k-2}\}. \quad (7)$$

The decision region is formed with the Boolean logic expression $$\hat{a}_{k-2} = A \vee (B \wedge E) \quad (8)$$

where the traditional binary Boolean logic set $\{0,1\}$ is equivalent to the set $\{-1,+1\}$ used for $\hat{a}_{k-2}$. FIGS. 8 and 9 show the boundaries A, B, C and D in signal space. The boundaries are depicted as lines labeled with the letter of the boundary in a circle referencing the boundary. The individual inputs from the table shown in FIG. 5 are labeled with the number corresponding to the Ψ value. As mentioned above, boundaries C and D can be merged to form boundary E.

Figure 10:
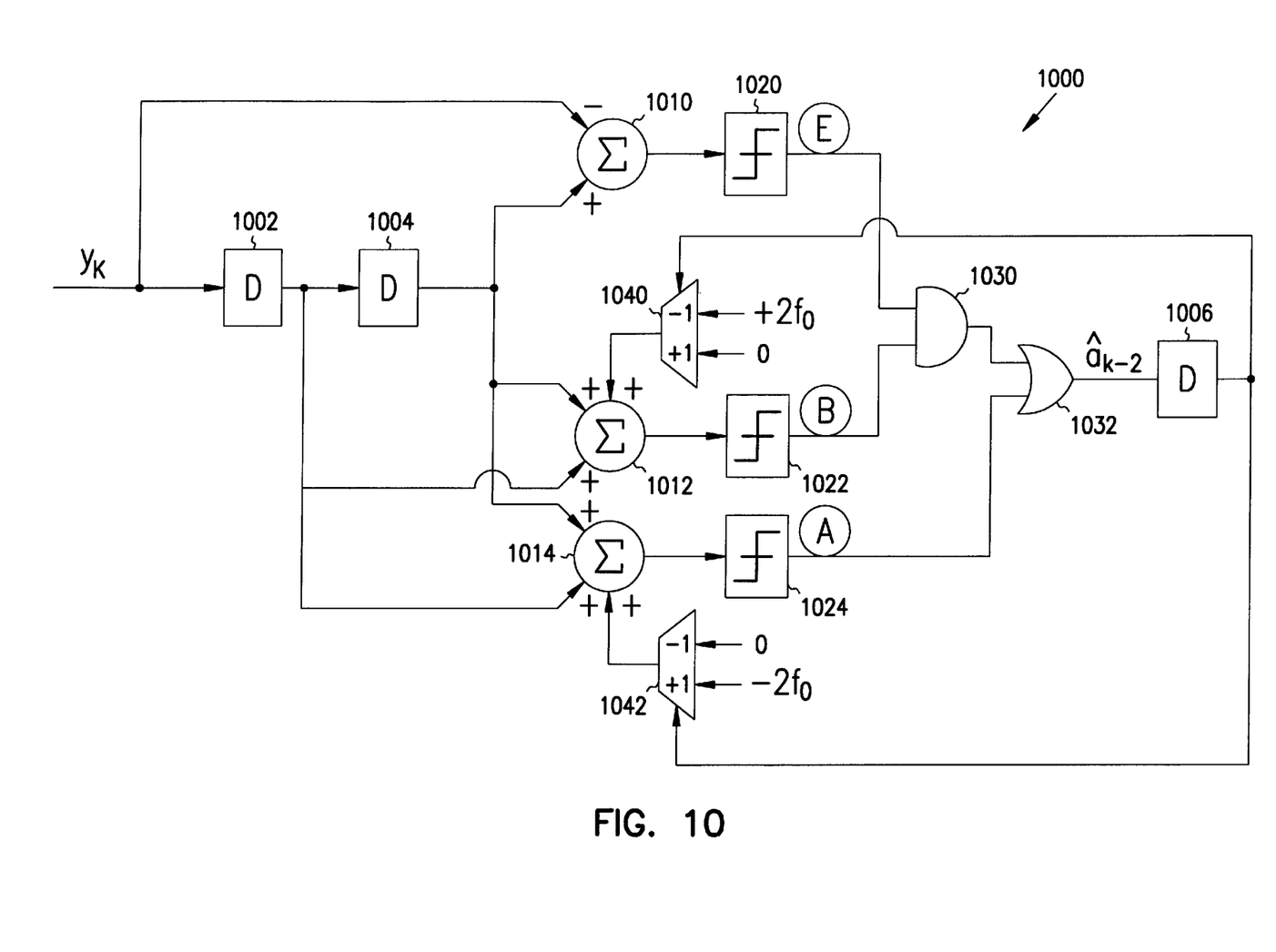
FIG. 10 is a one preferred embodiment of a detector apparatus for implementation of this invention.

FIG. 10 is a one preferred embodiment of a detector apparatus 1000 for implementation of this method of sequence detection. In the detector apparatus 1000, the multiplexer inputs are generalized for any κ>0. The detector apparatus 1000 includes two delay elements 1002 and 1004 which produce the terms $y_{k-1}$, and $y_{k-2}$. The detector apparatus 1000 also has three summing nodes, 1010, 1012, and 1014. The detector apparatus 1000 also has a first multiplexer 1040, and a second multiplexer 1042. The first multiplexer 1040 and the second multiplexer 1042 serve to eliminate one of the possible outputs for $\hat{a}_{k-2}$ and also removes an ISI term that is beyond the three used by the detector 1000. The possible output for $\hat{a}_{k-2}$ which can be eliminated is dependent on the value of $\hat{a}_{k-3}$. A third delay element 1006 is used to capture $\hat{a}_{k-3}$. The value of term $\hat{a}_{k-3}$ is used to eliminate one of the potential points in signal space as can be seen FIGS. 8 and 9. The blocks to the right of the summing nodes 1010, 1012, and 1014 are single bit quantizers 1020, 1022, and 1024 that produce a positive logic value for an input greater or equal to zero and a negative logic value for an input less than zero. The outputs of the single bit quantizers 1020, 1022, and 1024 correspond to the linear classifiers E, B, and A. The classifier outputs are then placed through an AND logic gate 1030 and through an OR gate to determine the estimated value $a_{k-2}$ which is denoted $\hat{a}_{k-2}$. In some particular circuits, it may be advantageous to replace the addition of the negative threshold before the slicer with a comparator. That is, the operation $\gamma_k = sgn\{x_k - \theta\}$ where $x_k$ is the appropriate combination of observations, is replaced with the operation $$\gamma_k = \begin{cases} 1, & \text{if } x_k \geq \theta \\ 0, & \text{if } x_k < \theta \end{cases} \quad (9)$$

which describes a comparator with threshold θ.

Figure 12:
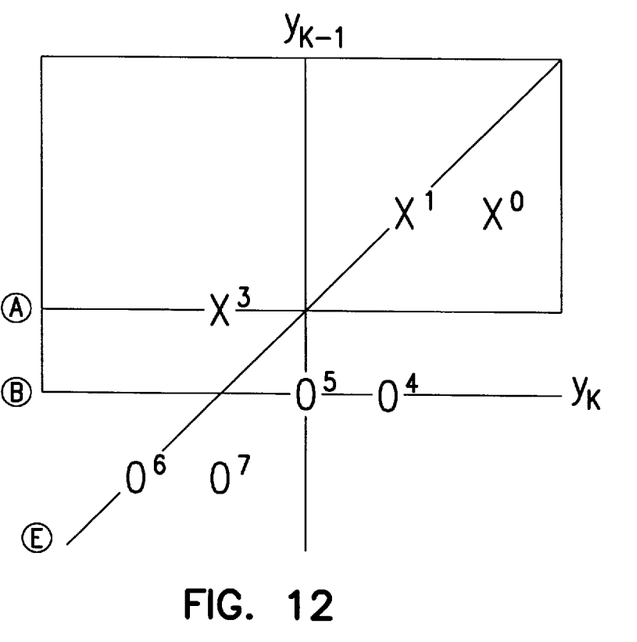
FIG. 12 is a graphical view of the relevant boundaries where $a_{k-3}$=−1 for the preferred embodiment of the invention shown in FIG. 11.
Figure 13:
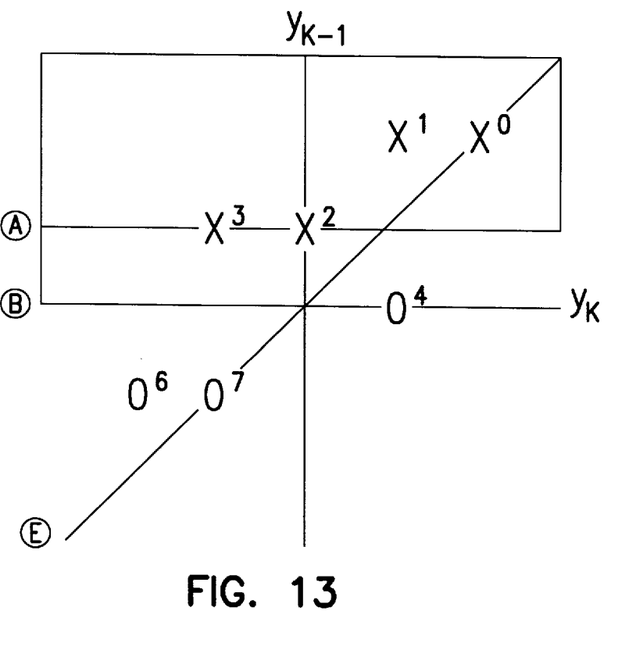
FIG. 13 is a graphical view of the relevant boundaries where $a_{k-3}$=+1 for the preferred embodiment of the invention shown in FIG. 11.

Turning now to FIGS. 11–13, another preferred embodiment of the invention will be discussed. Advantageously, in this other preferred embodiment of the present invention, the number of observation samples can be reduced with a corresponding reduction in the classifier complexity by projecting the three dimensional space onto two dimensions. The end result is simpler detector apparatus 1100 for the read data channel 330. In the previous embodiment of the 3D-110 detector, boundaries A and B both include the SUM $y_{k-1} + y_{k-2}$. This operation can be performed with the equalizers by placing a 1+D filter in both the forward and feedback filters, which changes the observation to $$y_k = f_0 a_k + 2f_1 a_{k-1} + f_2 a_{k-2} + \tilde{v}_k \quad (10)$$

where $\tilde{v}_k$ is the noise term previously labeled $v_k$ colored by the 1+D filter. Design of the filters is performed subject to the constraint that the first three samples of the equivalent channel response normalized by the first non-zero sample are $\{1, 2, 1\}$. Rewriting the classifiers for the new observation produces $$A = sgn\{y_{k-1} - \hat{a}_{k-3} - 1\}$$

$$B = sgn\{y_{k-1} - \hat{a}_{k-3} + 1\}$$

$$E = sgn\{y_{k-1}, y_k\} \quad (11)$$

Because the transformation simply involves moving a portion of the classifier computation from the explicit classifier expression to the equalization blocks, the outputs from the modified classifiers are equivalent to those in the first embodiment and the Boolean logic of (8) may be used without modification.

A block diagram of an apparatus suitable for the implementation of the detection method outlined is illustrated in FIG. 11. The detector apparatus 1100 includes a delay element 1102 which holds the sample $y_{k-1}$ which is a necessary input to some of the elements of the detector apparatus. This preferred embodiment has advantages compared with the previous detector 1000 shown in FIG. 7 for both analog and digital circuit implementations. For the analog circuit, the number of internal delay (storage) elements required is reduced by one and the number of inputs to the summing nodes is reduced from a maximum of three to two. Since the number of inputs to the summing nodes is two, the summing node and slicer of the detector 1000 can be replaced with comparators 1110, 1112, and 1114. The output from the comparators 1110, 1112, and 1114 are the classifier outputs E, B, and A, respectively. The output of the comparators 1110, 1112, and 1114 is labeled with the linear classifier and corresponding boundary E, B, and A it represents. The classifier outputs are then placed through an AND logic gate 1130 and through an OR gate 1132 to determine the estimate of $a_{k-2}$ which is denoted $\hat{a}_{k-2}$. For a digital circuit, a three input adder would be implemented with a cascade of two two-input adders. By moving the 1+D factor to the equalizers, this embodiment eliminates the need for one of these two adders. The equivalent comparator is substituted for the single remaining adder and slicer combination. The detector apparatus 1100 also has a first multiplexer 1140, and a second multiplexer 1142. The first multiplexer 1140 and the second multiplexer 1142 serve to add in the classifier constant and also removes an ISI term that is beyond the three used by the detector 1100. A second delay element 1106 is used to capture $\hat{a}_{k-3}$.

The symbols and boundaries on the two dimensional subspace are illustrated in FIG. 12 for $a_{k-3} = -1$ and in FIG. 13 for $a_{k-3} = +1$. Although this embodiment can be derived from the two dimensional subspace projection formed by the 1+D operation, the formulation is three dimensional in the context of the invention. Such equivalence results from the fact that the delay through the detector relative to the current observation sample remains three, with the detector using a three dimensional subspace formulation where the multipliers on the observation sample $y_{k-2}$ are selected to be zero. A true two dimensional formulation would produce an output $\hat{a}_{k-1}$ in response to $y_k$ and $y_{k-1}$. Therein lies the distinction between a two dimensional detector and the three dimensional detector embodied as a projection onto a lower dimensional subspace.

Figure 14:
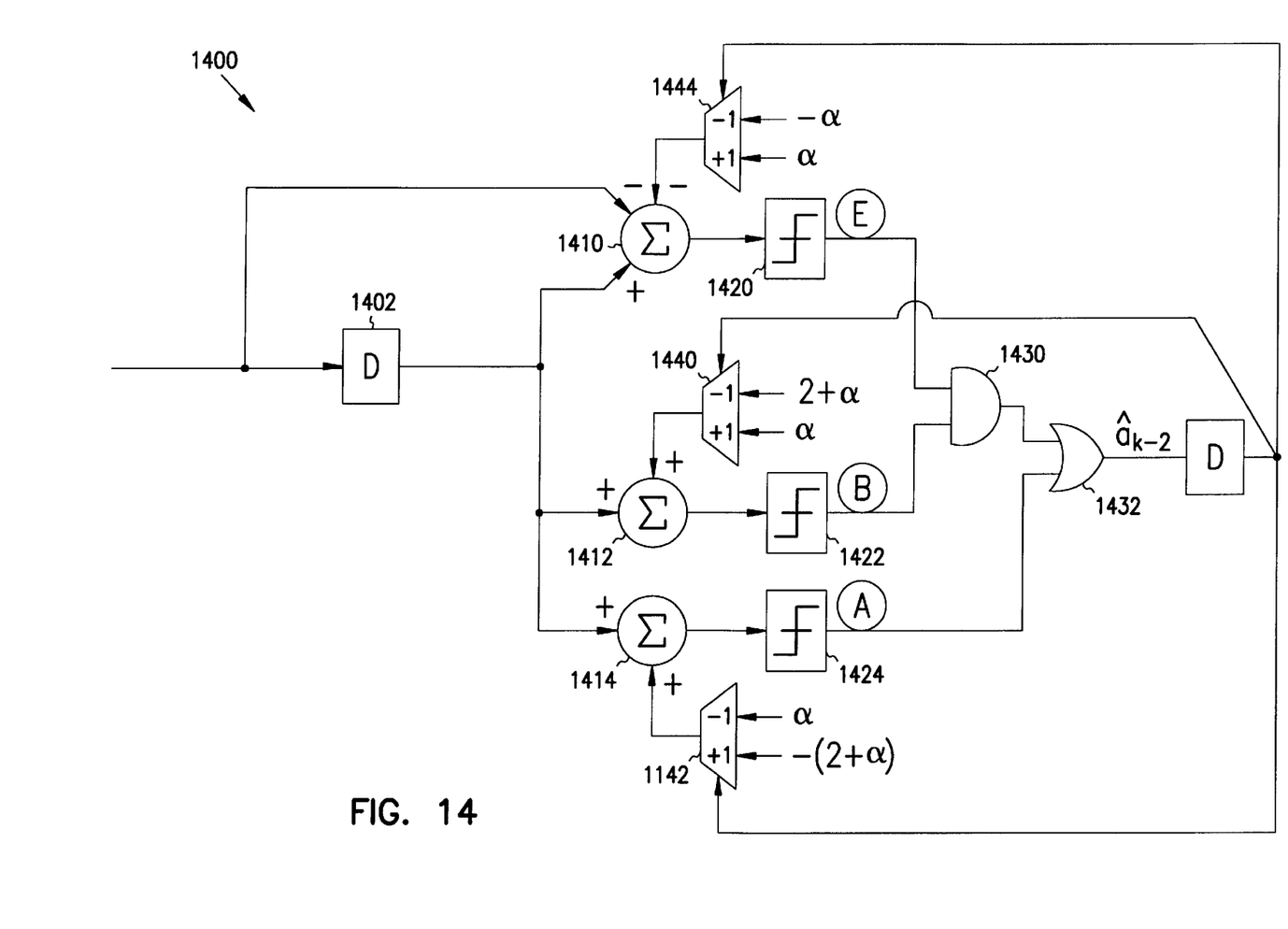
FIG. 14 is another preferred embodiment of a detector apparatus for implementation of this invention.

Another preferred embodiment of the present invention is shown in FIG. 14 as detector 1400. In detector 1400, the constraint is relaxed to $\{1, 1, \alpha\}$ so that the third value, $\alpha = f_2/f_0$, is unconstrained. Because the projection of the $\{1, 1, 0\}$ constraint onto the two dimensional subspace yielded a simpler apparatus, the embodiment of this constraint is considered under the same transformation, i.e., the observation is $$y_k = f_0(a_k + 2a_{k-1} + (1+\alpha)a_{k-2}) + \tilde{v}_k. \quad (12)$$

The block diagram of an apparatus for performing detection on the MTRj=2 constrained sequence equalized to $\{1, 1, \alpha\}$ is illustrated in FIG. 11. This embodiment is derived from the previous simply by subtracting the term $\alpha \hat{a}_{k-3}$ from the observation $y_{k-1}$. Note that the two are not identical; in the form considered here, the observation $y_k$ has an additional term $\alpha a_{k-2}$. However, this only affects classifier E because A and B use only $y_k$. For $\alpha < 0$, the additional term moves symbols away from boundary E, increasing distance and reducing the probability of error.

If the apparatus were to be implemented as a digital circuit, the three input addition for classifier E would increase the number of serial operations and reduce the maximum operating speed. For $\alpha < 0$, the removal of $\alpha a_{k-3}$ from classifier E can be ignored, because the resulting loss of distance along the $y_k$ axis in signal space for certain combinations of symbols and $a_{k-3}$ is offset by the increase in distance along the $y_{k-1}$ axis. To accommodate situations where $\alpha$ would naturally be greater than a positive value, the filter design algorithm can be monitored and in the case where $\alpha > 0$, the design would be directed by the constraint $\alpha = 0$, thus constraining the channel to the DFE-110 response.

The detector apparatus 1400 includes a delay element 1402 produces the term $y_{k-1}$. The detector apparatus 1400 also has three summing nodes, 1410, 1412, and 1414. The detector apparatus 1400 also has a first multiplexer 1440, a second multiplexer 1442, and a third multiplexer 1444. The first multiplexer 1440, the second multiplexer 1442, and a third multiplexer 1444, remove an ISI terms corresponding to past decisions. The first multiplexer 1440, and the second multiplexer 1442 also add in the classifier constant. The possible output for $\hat{a}_{k-2}$ which can be eliminated is dependent on the value of $\hat{a}_{k-3}$. A second delay element 1406 is used to capture $\hat{a}_{k-3}$. The value of term $\hat{a}_{k-3}$ is used to eliminate one of the potential points in signal space. The blocks to the right of the summing nodes 1410, 1412, and 1414 are single bit quantizers 1420, 1422, and 1424 that produce a positive logic value for an input greater or equal to zero and a negative logic value for an input less than zero. The outputs of the single bit quantizers 1420, 1422, and 1424 correspond to the boundaries E, B, and A. The boundary conditions are then placed through an AND logic gate 1430 and through an OR gate 1432 to determine the estimated value $a_{k-2}$ which is denoted âk-2.

Although the present invention has been described with reference to preferred embodiments involving MTRj=2 constrained channels equalized to give equivalent channel responses where the first three samples with relative to the magnitude of the first are $\{1, 1, 0\}$ and $\{1, 1, \alpha\}$ and where the observation space resulting from these constraints is projected onto a two dimensional subspace by factoring a 1+D term, persons skilled in the art will recognize that changes may be made in form and detail without departing from the spirit and scope of the invention.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the detector while maintaining substantially the same functionality without departing from the scope and spirit of the present invention. In addition, although the preferred embodiment described herein is directed to a detector for a information storage system, it will be appreciated by those skilled in the art that the teachings of the present invention can be applied to other systems, such as communications or other systems, without departing from the scope and spirit of the present invention. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for estimating binary input symbols received as a read signal from a data channel in an information storage system, said method comprising the steps of:

sampling the read signal;

equalizing the read signal samples subject to a shaping constraint to produce a cursor sample and at least two postcursor samples, wherein the constraint requires that the magnitude of at least one of the two postcursor samples has a selected value relative to the cursor sample;

forming an observation space using a fixed number, m, of consecutive equalized read signal samples; and partitioning the observation space with a plurality of linear classifiers such that the probability that the m observation samples for a particular m-dimensional channel symbol correspond to a point on the opposite side of the linear classifier boundary is minimized for received samples in the channel with the linear classifier boundary positioned between a pair of m-dimensional channel symbols such that binary input symbol multiplying the second postcursor term in the equalized channel response is different for each of the two symbols.

2. The method for detecting data in an information storage system of claim 1, wherein the step of partitioning the observation space further comprises the step of eliminating linear classifiers that are redundant.

3. The method for detecting data in an information storage system of claim 1, further comprising the step of removing intersymbol interference terms due to past estimates of the binary input symbols from the equalized read signal samples.

4. The method for detecting data in an information storage system of claim 3, wherein the step of partitioning the observation space further comprises the step of eliminating linear classifiers that are redundant.

5. The method for detecting data in an information storage system of claim 4, wherein the step of forming an observation space results in a three-dimensional observation space.

6. The method for detecting data in an information storage system of claim 1, wherein the step of equalizing the read signal samples uses a shaping constraint in which at least one of the postcursor samples of the equalized channel response has a selected value relative to the cursor sample used to estimate the binary input.

7. The method for detecting data in an information storage system of claim 1, wherein the step of equalizing the read signal samples subject to a shaping constraint further comprising the step of adding a factor of 1+D into the equalizing step.

8. A method for estimating binary input symbols received from an intersymbol interference channel subject to additive white Gaussian noise comprising the steps of:

equalizing the channel response subject to the constraint that the magnitude of at least one of the two postcursor samples has a selected value relative to the cursor sample;

forming an observation sample from each sample of the equalized received signal by subtracting intersymbol interference components due to previous input symbol estimates by means of decision feedback equalization;

receiving m consecutive observation samples where m<4;

removing intersymbol interference components due to previous estimates from each observation sample;

forming an m-dimensional observation space with m consecutive observation samples where m<4, each of the m observations corresponding to a coordinate on an axis in the m-dimensional observation space, where each axis is orthogonal to all other axes in the observation space and each axis is identified by the component of the equalized channel response by which the binary input symbol to be estimated is multiplied;

partitioning the observation space with a plurality of linear classifiers such the probability that the m observation samples for a particular m-dimensional channel symbol correspond to a point on the opposite side of the linear classifier boundary is minimized for received samples subject to additive white Gaussian noise in the channel with the linear classifier boundary positioned between a pair of m-dimensional channel symbols such that binary input symbol multiplying the second postcursor term in the equalized channel response is different for each of the two symbols;

forming decision regions which map to one of the two possible binary input symbols which multiply the second postcursor term of the sampled equalized channel response in the most recent observation sample by means of a binary Boolean logic rule, such that the inputs to the logic rule are the outputs from the linear classifiers and the two possible output values of the logic rule correspond unambiguously to the two possible input symbols; and releasing an estimate of the binary input symbol synchronous with the sampling of the received signal.

9. The method as described in claim 8 wherein the sequences of binary input symbols are subject to a constraint that limits the number of consecutive transitions of the channel input symbols to such that 0<j<3.

10. The method as described in claim 9 wherein m-dimensional channel symbols corresponding to input sequences with more than j consecutive transitions of channel input are removed from consideration during the partitioning of the observation space and formation of decision regions.

11. The method as described in claim 10 wherein m-dimensional channel symbols corresponding to input sequences combined with the most recent channel input estimate contain more than j consecutive transitions, said more than j transitions being removed during the partitioning of the observation space and formation of decision regions.

12. The method as described in claim 11 wherein the first postcursor sample in the equalized channel response is equal to the cursor term and the resulting observation space has m=3 dimensions.

13. The method as described in claim 12 wherein a 1+D factor is included in the equalizers such that the dimensionality of the observation space is reduced from m=3 to m=2 and the second postcursor term is the sum 1+$\alpha$ such that $\alpha$ is unconstrained and equal to the second postcursor for the response without the 1+D factor.

14. The method as described in claim 13 wherein the term $\alpha$ multiplied by the previous estimate of the binary channel input symbol is subtracted from the oldest of the two observation samples in the m=2 dimensional observation space.

15. The method as described in claim 14 wherein the linear classifiers are formed for the m-dimensional symbols with $\alpha$=0 regardless of the actual value of $\alpha$.

16. The method as described in claim 15 wherein the second postcursor term of the sampled equalized channel response is constrained to be 1+$\alpha$ such that $\alpha$ is not greater than zero.

17. The method as described in claim 8 wherein the first two postcursor terms in the sampled equalized channel response have magnitudes of one and zero, respectively, said first two postcursor terms multiplied by the magnitude of the cursor term such that the resulting observation space has m=3 dimensions and is partitioned by three linear classifiers.

18. The method as described in claim 17 wherein the step of equalizing the channel response further includes the step of adding a 1+D factor to reduce the dimensionality of the observation space from m=3 to m=2.

19. A read channel for an information handling system, said read channel reading stored binary information on the disks, said read channel including a detector for estimating the binary input value of a selected sample, said detector further comprising:

a sampler for sampling the read signal;

an equalizer for shaping the read signal samples subject to a constraint, said equalizer producing an equalized signal having a cursor term and at least two postcursor terms, wherein the constraint requires that the magnitude of at least one of the at least two postcursor samples has a selected value relative to the cursor sample;

a plurality of linear classifiers for partitioning an observation space into two decision regions corresponding to one of two binary input symbols, such that the probability that the m observation samples for a particular m-dimensional channel symbol correspond to a point on the opposite side of the linear classifier boundary is minimized for received samples in the channel with the linear classifier boundary positioned between a pair of m-dimensional channel symbols such that binary input symbol multiplying the second postcursor term in the equalized channel response is different for each of the two symbols; and logic elements to estimate into which of two decision regions a particular sample maps into.

20. The read channel for an information handling system of claim 19 further comprising a feedback filter for removing intersymbol interference terms due to past estimates of the binary input symbols from the equalized read signal samples.

21. The read channel for an information handling system of claim 19 wherein the constraint of the equalizer for shaping the read signal samples incorporates a delay term (1+D).

22. An information storage device, comprising:

a housing;

disks rotatably attached to said housing, said disks having a surface capable of storing binary information; and a read channel for reading stored binary information on the disks, said read channel including a detector for estimating the binary input value of a selected sample, said detector further comprising:

a sampler for sampling the read signal;

an equalizer for shaping the read signal samples subject to a constraint, aid equalizer producing an equalized signal having a cursor term and at least two postcursor terms, wherein the constraint requires that the magnitude of at least one of the at least two postcursor samples has a selected value relative to the cursor sample;

a plurality of linear classifiers for partitioning an observation space into two decision regions corresponding to one of two binary input symbols, such that the probability that the m observation samples for a particular m-dimensional channel symbol correspond to a point on the opposite side of the linear classifier boundary is minimized for received samples in the channel with the linear classifier boundary positioned between a pair of m-dimensional channel symbols such that binary input symbol multiplying the second postcursor term in the equalized channel response is different for each of the two symbols; and logic elements to estimate into which of two decision regions a particular sample maps into.

23. The information storage device of claim 22 further comprising a feedback filter for removing intersymbol interference terms due to past estimates of the binary input symbols from the equalized read signal samples.

24. The information storage device of claim 22 further comprising a write channel for writing binary information onto the disks, said write channel including an encoder for implementing a maximum transition run code with a constraint limiting the maximum number of consecutive transitions in the recorded data to two.

25. An apparatus for estimating binary input symbols received from an intersymbol interference channel subject to additive white Gaussian noise comprising:

an equalizer subjecting the channel response to the constraint that the magnitude of at least one of the two postcursor samples has a selected value relative to the cursor sample;

a feedback filter for by subtracting intersymbol interference components due to previous input symbol estimates from each sample of the equalized received signal to form an observation sample;

an input for receiving m consecutive observation samples, where m<4;

an m-dimensional observation space with m consecutive observation samples where m<4, each of the m observations corresponding to a coordinate on an axis in the m-dimensional observation space, where each axis is orthogonal to all other axes in the observation space and each axis is identified by the component of the equalized channel response by which the binary input symbol to be estimated is multiplied;

a plurality of linear classifiers for partitioning the observation space such the probability that the m observation samples for a particular m-dimensional channel symbol corresponds to a point on the opposite side of the linear classifier boundary and is minimized for received samples subject to additive white Gaussian noise in the channel with the linear classifier boundary positioned between a pair of m-dimensional channel symbols such that binary input symbol multiplying the second postcursor term in the equalized channel response is different for each of the two symbols, said linear classifiers forming decision regions which map to one of the two possible binary input symbols which multiply the second postcursor term of the sampled equalized channel response in the most recent observation sample by means of a binary Boolean logic rule, such that the inputs to the logic rule are the outputs from the linear classifiers and the two possible output values of the logic rule correspond unambiguously to the two possible input symbols; and an output for an estimate of the binary input symbol synchronous with the sampling of the received signal.

26. The apparatus of claim 25 wherein the sequences of binary input symbols are subject to a constraint that limits the number of consecutive transitions of the channel input symbols to j such that 0<j<3.

27. The apparatus of claim 25 wherein the equalizer removes the m-dimensional channel symbols corresponding to input sequences with more than j consecutive transitions of channel input.

28. The apparatus of claim 27 wherein m-dimensional channel symbols, corresponding to input sequences combined with the most recent channel input estimate contain more than j consecutive transitions, said more than j transitions being removed by the linear classifiers.

29. The apparatus of claim 28 wherein the inputs further comprise a cursor term and a postcursor term, the first two postcursor terms in the sampled equalized channel response having magnitudes of one and zero, respectively, said first two postcursor terms multiplied by the magnitude of the cursor term such that the resulting observation space has m=3 dimensions and is partitioned by three linear classifiers.

30. The apparatus of claim 29 wherein the step of equalizer includes the step of a 1+D factor to reduce the dimensionality of the observation space from m=3 to m=2.

31. The apparatus of claim 28 wherein the first postcursor sample in the equalized channel response is equal to the cursor term and the resulting observation space has m=3 dimensions.

32. The apparatus of claim 31 wherein a 1+D factor included in the equalizers reduces the dimensionality of the observation space from m=3 to m=2 and the second postcursor term is the sum 1+$\alpha$ such that $\alpha$ is unconstrained and equal to the second postcursor for the response without the 1+D factor.

33. The apparatus of claim 32 wherein the term $\alpha$ multiplied by the previous estimate of the binary channel input symbol is subtracted from the oldest of the two observation samples in the m=2 dimensional observation space.

34. The apparatus of claim 33 wherein the linear classifiers for the m-dimensional symbols include $\alpha=0$ regardless of the actual value of $\alpha$.

35. The apparatus of claim 34 wherein the second postcursor term of the sampled equalized channel response is constrained to be 1+$\alpha$ such that $\alpha$ is not greater than zero.

* * * * *

UNITED STATES PATENT AND TRADEMARK OFFICE
CERTIFICATE OF CORRECTION

PATENT NO. : 5,956,195

DATED: Sep. 21, 1999

INVENTOR(S) : Barrett J. Brickner, et al.

It is certified that error appears in the above-identified patent and that said Letters Patent is hereby corrected as shown below:

Title page where Attorney, Agent or Firm is specified, delete "Woesnner", and therefor insert --Woessner--.

In column 13, line 58, insert --j-- between "to" and "such".

In column 15, line 15, delete "aid" and therefor insert --said--.

In column 15, line 53, delete "by".

In column 11, line 57, the second "k-2" should be subscript.

Signed and Sealed this

Twenty-first Day of November, 2000

Q. TODD DICKINSON

*Attest:*

*Attesting Officer*      *Director of Patents and Trademarks*